United States Patent [19]

Blatt et al.

[11] Patent Number: 5,051,055
[45] Date of Patent: Sep. 24, 1991

[54] ARTICLE LIFTING DEVICE

[75] Inventors: John A. Blatt, 47 Willison, Grosse Pointe Shores, Mich. 48236; David Crorey, Utica, Mich.

[73] Assignee: John A. Blatt, Grosse Pointe Shores, Mich.

[21] Appl. No.: 446,157

[22] Filed: Dec. 5, 1989

[51] Int. Cl.$^5$ .............................................. B25J 11/00
[52] U.S. Cl. .................................. 414/626; 414/627; 901/21
[58] Field of Search ............... 414/619, 626, 627, 673, 414/749, 751, 752, 744.1; 294/19.1, 64.1; 901/21, 48; 187/94, 95

[56] References Cited

U.S. PATENT DOCUMENTS

| 864,936 | 9/1907 | Taylor | 414/626 |
|---|---|---|---|
| 2,540,612 | 2/1951 | Fischer et al. | 414/626 X |
| 3,224,615 | 12/1965 | Henry | 414/626 |
| 3,721,352 | 3/1973 | Messmer | 414/627 |
| 4,032,020 | 6/1977 | Kato et al. | 414/626 X |
| 4,674,784 | 6/1987 | Wooley | 414/627 X |
| 4,720,227 | 1/1988 | Eberle | 414/627 X |
| 4,850,782 | 7/1989 | Focke | 414/627 X |

FOREIGN PATENT DOCUMENTS

| 3048572 | 7/1982 | Fed. Rep. of Germany | 901/21 |
|---|---|---|---|
| 3709845 | 10/1988 | Fed. Rep. of Germany | 901/21 |
| 0637324 | 12/1978 | U.S.S.R. | 414/673 |
| 2201658 | 9/1988 | United Kingdom | 414/673 |

Primary Examiner—Frank E. Werner
Assistant Examiner—Brian K. Dinicola
Attorney, Agent, or Firm—Basile and Hanlon

[57] ABSTRACT

An article lifting device includes vertically elongate hollow tubular frame members, one telescopically received within the other for guided vertical movement. The outer member includes a bracket for fixedly mounting the outer member upon a support, which may be a horizontally movable shuttle carriage, and carries a reversible drive motor coupled to a drive gear mounted for rotation about a horizontal axis near the lower end of the outer member. A flexible belt having teeth at one side is fixed at opposite ends to the upper and lower ends of the inner member and a bight portion of the belt is meshed with the drive gear, the bight portion projecting from the inner member between two idler rolls mounted on the outer member and passing around the drive gear. The idler rolls hold those portions of the belt other than the idler rolls in face-to-face engagement with the inner member. This arrangement leaves the entire interior of the inner member available for the reception of a counterbalance cylinder and sliding electrical and pneumatic connections between the inner and outer member used to supply electric power and air under pressure to article holder devices carried at the lower end of the inner member.

5 Claims, 4 Drawing Sheets

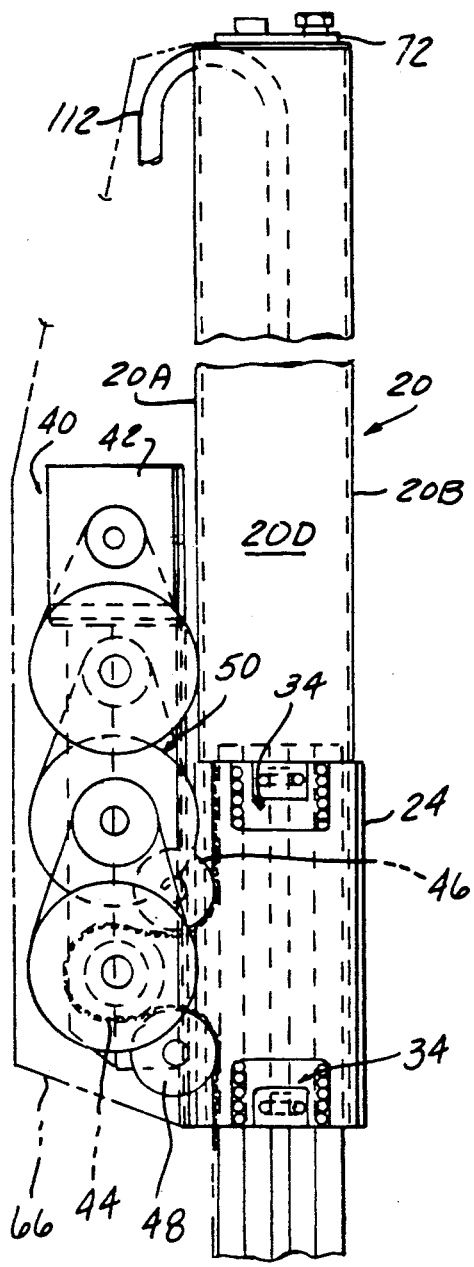
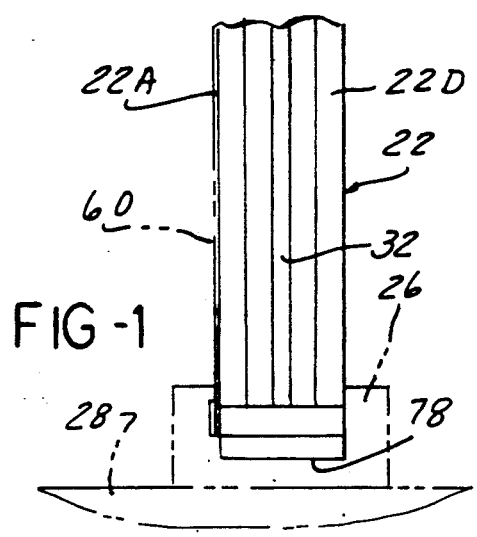
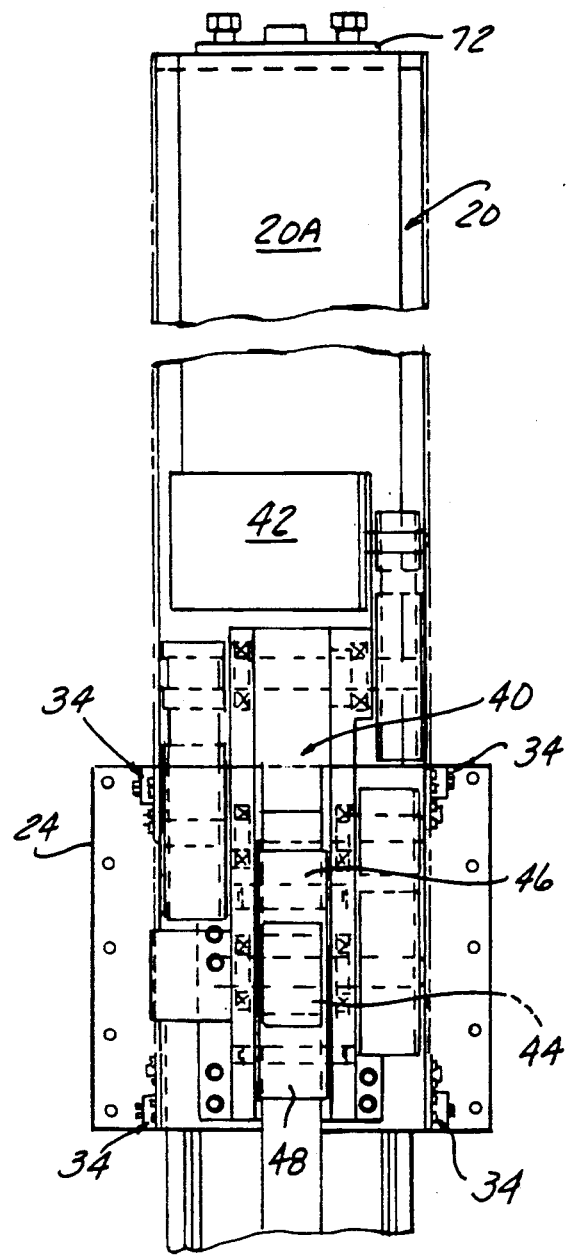
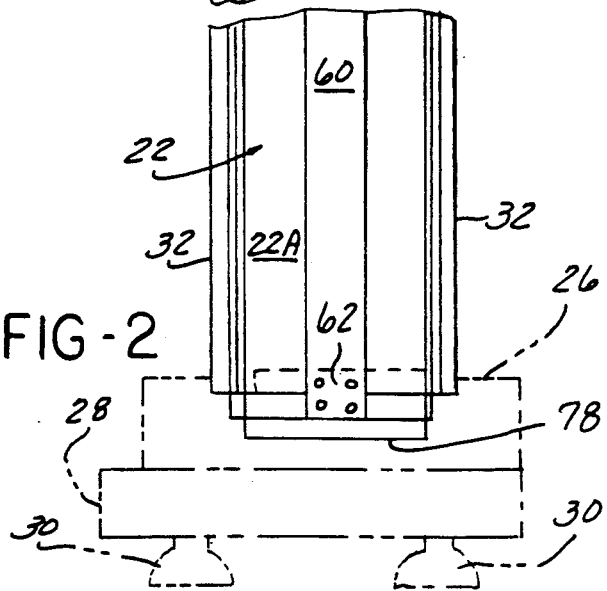
FIG-1
FIG-2

ARTICLE LIFTING DEVICE

BACKGROUND OF THE INVENTION

Field of the Invention

The present invention is directed to an article lifting device of the type employed to lift or lower articles in a production line setting, typically in an application where the lifting device may be mounted upon a horizontally extending shuttle unit in which the lifting device lifts an article from one work station, is transferred horizontally by the shuttle unit, and then lowers the article at a second work station.

Article lifting devices of the general type with which the present invention is concerned are disclosed in U.S. Pat. Nos. 4,475,863 and 4,444,540. The devices disclosed in those patents include a vertically elongate hollow tubular lifting member which may be mounted upon a shuttle unit, and a second vertically elongate hollow tubular member telescopically received within the first tubular member for vertical reciprocation within the first tubular member. An article holding device is mounted on the bottom of the lifting member, and power driven means are employed to drive the lifting member in vertical movement within first member. In the case of U.S. Pat. Nos. 4,444,540 and 4,475,863, referred to above, the power drive takes the form of a vertically extending ball screw mounted on the fixed member operatively received within a nut on the second or lifting member, the ball screw being driven by a reversible motor. While this type of drive, particularly when operated with an electronic control, can achieve an extremely precise positioning of the workpiece, the ball screw and nut coupling between the relatively movable tubular members requires a substantial amount of clearance, and the speed of the drive, particularly where relatively heavy workpieces are handled, has some practical limitations.

In other arrangements, the drive takes the form of a relatively long stroke pneumatic motor having its cylinder coupled typically to the outer or fixed frame member and its piston rod to the vertically movable lift member. This arrangement also presents clearance problems and control problems. Where a relatively heavy part is coupled to the lift member, pressure must build up beneath the piston until the weight of the article is overcome. If air under pressure is admitted rapidly, the lifting force developed by the piston likewise increases rapidly with the result that the workpiece is subjected to a high initial acceleration, rather than being smoothly lifted from dead rest. A similar problem is encountered at the opposite end of the stroke. Further, practical limitations on the weight of workpieces which can be handled arise in that clearance problems impose limitations on the cylinder diameter.

The present invention is directed to an article lifting device employing a tubular lifting member telescopically received within a fixed or outer tubular member which is provided with a drive located externally of the lifting member to minimize clearance problems, which may be smoothly accelerated and decelerated and precisely positioned, and which is capable of handling workpieces of substantial weight.

SUMMARY OF THE INVENTION

A lift embodying a present invention includes a vertically elongate hollow tubular outer or fixed frame member which telescopically receives a vertically elongate hollow tubular inner or lifting member. The fixed frame and lifting member are both of a generally rectangular transverse cross section, having two opposed side walls interconnected by front and rear walls. The lifting member is of smaller transverse dimensions than the fixed frame member to provide clearances between the two opposed side walls of the respective members sufficient to accommodate guide rails on the other sides of the two opposed side walls of the lifting member which are engaged by roller assemblies mounted upon the fixed frame member and projecting through openings to engage the guide rails to guide the lifting member in vertical movement relative to the fixed frame member.

A drive unit is mounted on the outer side of the front wall of the fixed frame member near the lower end of the fixed frame member. The drive includes a reversible drive motor coupled through a suitable speed reduction arrangement to a drive gear mounted for rotation about a fixed horizontal drive axis parallel to and offset forwardly from the outer surface of the front wall of the fixed frame member. An opening is cut through the front wall of the fixed frame member in alignment with the drive gear and a pair of idler rolls are mounted for rotation about idler axes parallel to the drive gear axis within the opening at locations respectively above and below the drive gear.

A drive coupling between the drive gear and lifting member is provided by an elongate flexible belt fixedly secured at its opposite ends to the outer side of the front wall of the lifting member to lie flat against the front wall. The surface of the belt facing the front wall is formed with transversely extending teeth and a bight in the belt projects forwardly from the front wall of the lifting member, through the opening in the front wall of the fixed frame member between the idler rolls and around the drive gear with the teeth on the belt meshed with the teeth of the drive gear. The belt is secured in tension and the idler rolls are so located as to clear the front wall of the lifting member by a distance only slightly greater than the thickness of the belt so that those portions of the belt other than the bitht lie flat against the front wall of the lifting member. Upon rotation of the drive gear, the belt is driven upwardly or downwardly around the drive gear to drive the lifting member upwardly or downwardly relative to the fixed frame member.

In this arrangement, none of the elements of the lift drive are located within the interior of the lifting member, hence this space is available for other components of the drive. There is ample room within the interior of the hollow tubular lifting member to provide clearance for a pneumatic counterbalance motor.

The lifting member includes a coupling device at its lower end for coupling a workpiece holding or gripping assembly employed to detachably hold or grip a workpiece to be handled by the lift. The workpiece holding or gripping device typically will include one or more pneumatically or electrically actuated gripping elements, and to avoid the necessity of attaching and handling external electric power supply cables or pneumatic hoses to the work holder, pneumatic and electrical connections are led downwardly through the interior of the fixed frame member and lifting member to electrical connectors and pneumatic couplings mounted at the bottom of the lifting member. The electrical connector takes the form of an electric cable led downwardly from the top of the fixed frame member conveniently along the side of the counterbalance cylinder to a brush or contact block mounted on the lower end of the counterbalance cylinder. Electrical contact strips are mounted in the interior of the lifting member to extend vertically from the upper end of the lifting member to its lower end, the strips being supported and blocks of electrical insulating material which hold the strips fixedly in spaced parallel relationship to each other and to the wall of the lifting member. Each of the strips is slidably engaged by one of the brushes or contacts mounted on the counterbalance cylinder so that each strip is engaged by a brush or contact throughout full range of vertical movement of the lifting member.

The pneumatic connections to the lower end of the lifting member takes a form of a pair of vertically extending hollow tubular conduits slidably and telescopically sealed to each other, the lower end of one conduit being secured to the lower end of the lift member in communication with the pneumatic coupling, while the other conduit is fixedly secured at its upper end to the upper end of the fixed frame member and is adapted to be connected to a source of air under pressure.

Other objects and features of the invention will become apparent by reference to the following specification and to the drawing.

BRIEF DESCRIPTION OF THE DRAWINGS

In the drawings

FIG. 1 is a side elevational view, with certain parts omitted or broken away, of a lifting device embodying the present invention;

FIG. 2 is a front view, with certain parts omitted or broken away, of the lifting device of FIG. 1;

DESCRIPTION OF THE PREFERRED EMBODIMENT

Figure 4:
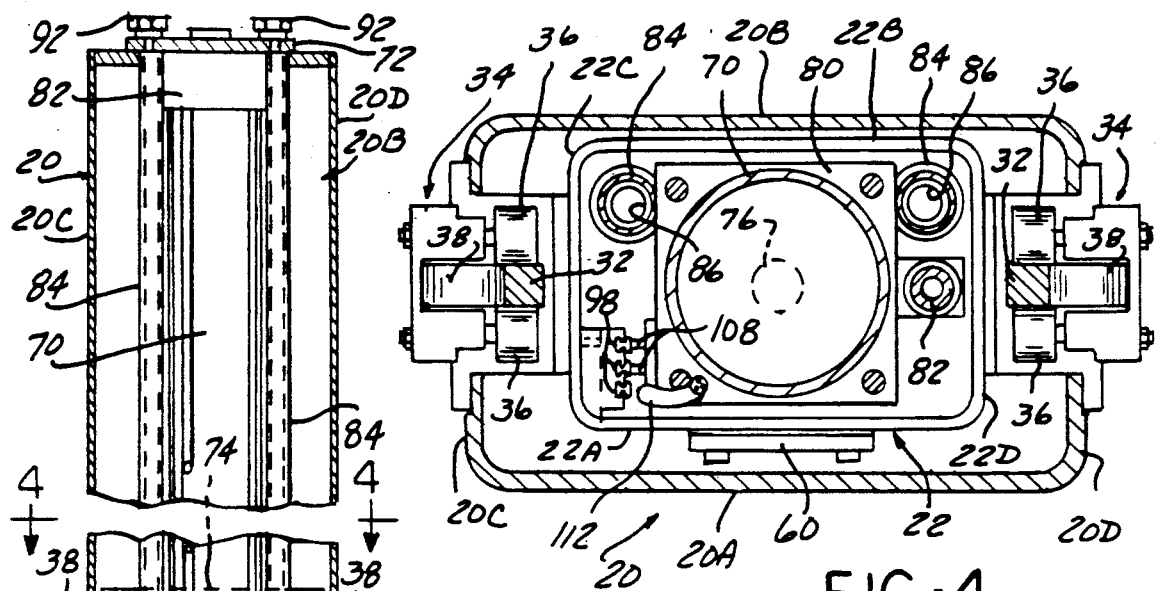
FIG. 4 is a cross sectional view taken on line 4—4 of FIG. 3.

A lifting device embodying the present invention includes a hollow tubular upper or fixed frame member designated generally 20 and a hollow tubular lower frame member designated generally 22. A best seen in FIG. 4, both of members 20 and 22 are of a generally rectangular transverse cross section, the transverse dimensions of lifting member 22 being substantially less than the corresponding dimensions of the fixed frame member 20 so that lifting member 22 may be telescopically received within fixed frame member 20 with a reasonable amount of clearance. A suitable mounting bracket 24 is fixedly secured to the fixed frame member 20 for the purposes of mounting fixed frame member 20 fixedly upon a suitable support, (not shown), which typically will be the shuttle carriage of a shuttle conveyor operable to move the lift, and a workpiece supported upon the lift, horizontally from one work station to another. The article or workpiece to be handled will be detachably coupled to the lower end of lift member 22 by a coupling assembly whose construction will be determined by the particular application and workpieces to be handled. Typically, the coupling will include two major elements—a coupling member indicated in broken line at 26 in FIGS. 1-3, and a work holder frame 28 shown in broken line in FIGS. 1-3. The coupling element 26 will be fixedly and permanently attached to lifting member 22 while the work holder frame 28 will be configured to the particular workpiece to be handled and detachably mounted upon coupling element 26. The frame 28 will carry a plurality of work engaging holders or grippers, such as vacuum cups 30 (FIG. 2). Typically, the work engaging parts of the work holder will be pneumatically or hydraulically or electrically actuated, and, as will be described in greater detail below, the lift of the present invention includes internal structure for supplying air under pressure and electrical power to the lower end of lift member 22.

Figure 5:
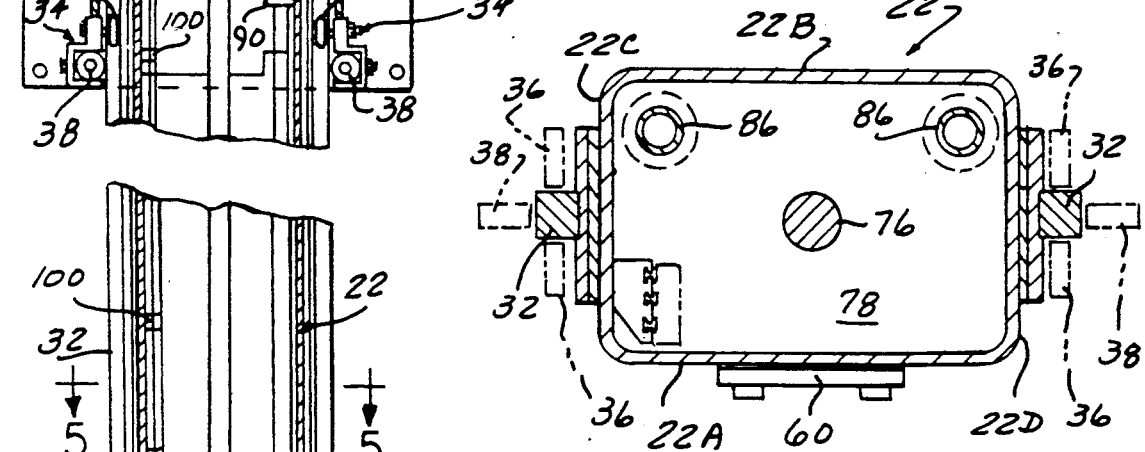
FIG. 5 is a cross sectional view taken on line 5—5 of FIG. 3.

Referring now particularly to FIGS. 4 and 5, fixed frame member 20 is of a hollow box shaped cross section having a front wall 20A, a rear wall 20B and opposed side walls 20C, 20D. Similarly, lift member 22 is formed with a front wall 22A, rear wall 22B, and opposed side walls 22C, 22D. Elongate guide rails 32 are fixedly mounted upon the outer side of each of opposed side walls 22C and 22D of lift member 22 and extend vertically substantially the entire length of lift member 22. Roller assemblies designated generally 34 are fixedly mounted upon the opposed side walls 20C and 20D of fixed frame member 20, each roller assembly 34 including a pair of spaced opposed rollers 36 which, as best seen in FIG. 4, are adapted to engage the opposite sides of a guide rail 32, and a third roller 38 mounted to roll along the outer side of guide rail 32. The engagement between the various rollers 36, 38 and the guide rails 32 guides lift member 20 in movement along a fixed vertical path relative to fixed frame member 20.

To drive lift member 22 in vertical movement relative to fixed frame member 20, a drive assembly designated generally 40 is mounted at a fixed location upon the front face 20A of fixed frame member 20. Drive 40 includes a reversible electric motor 42 which is drivingly coupled to a drive gear 44 mounted adjacent the lower end of fixed frame member 20 for rotation about a fixed horizontal axis parallel to and spaced forwardly from the front wall 20A of frame member 20. Upper 46 and lower 48 idler rolls are mounted respectively above and below drive gear 44 for rotation about horizontal axes parallel to that of the drive gear and so located that the idler rolls 46 and 48 are quite close to tangential relationship to the front wall 22A of lift member 20. In the particular drive shown in the drawings, motor 42 is coupled to drive gear 44 via a speed reducing arrangement constituted by a belt and pulley train designated generally 50.

Figure 7:
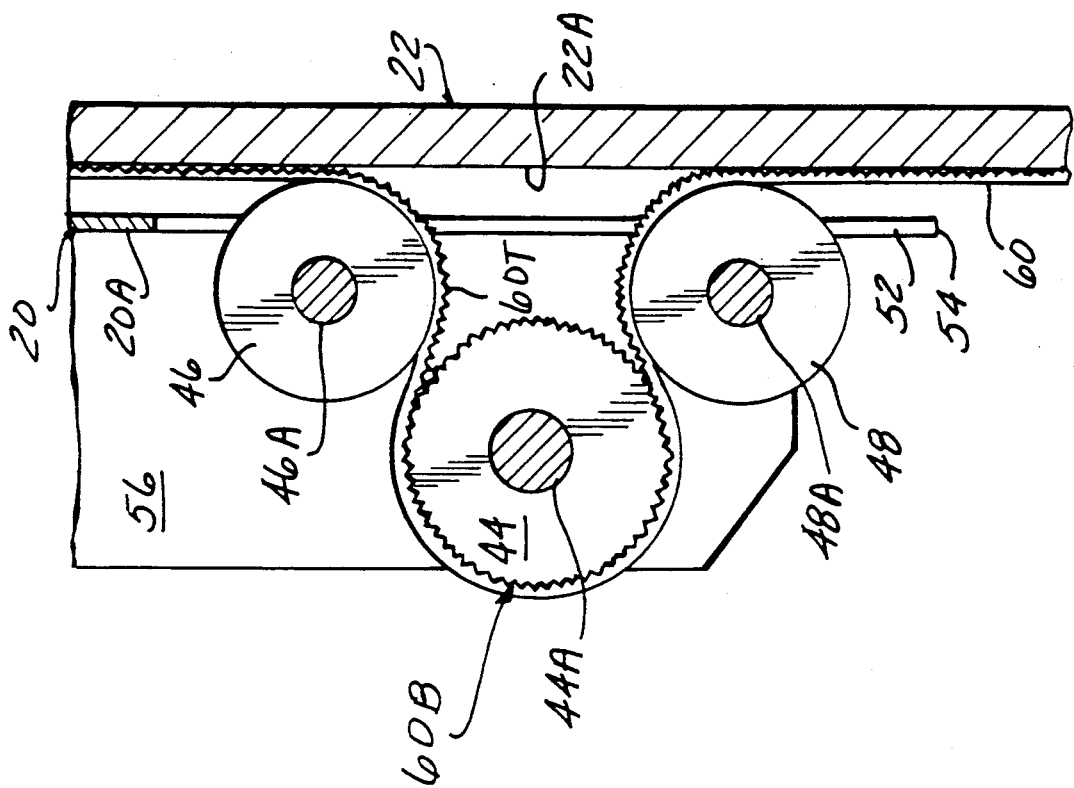
FIG. 7 is a simplified cross sectional view taken on line 7—7 of FIG. 6.
Figure 6:
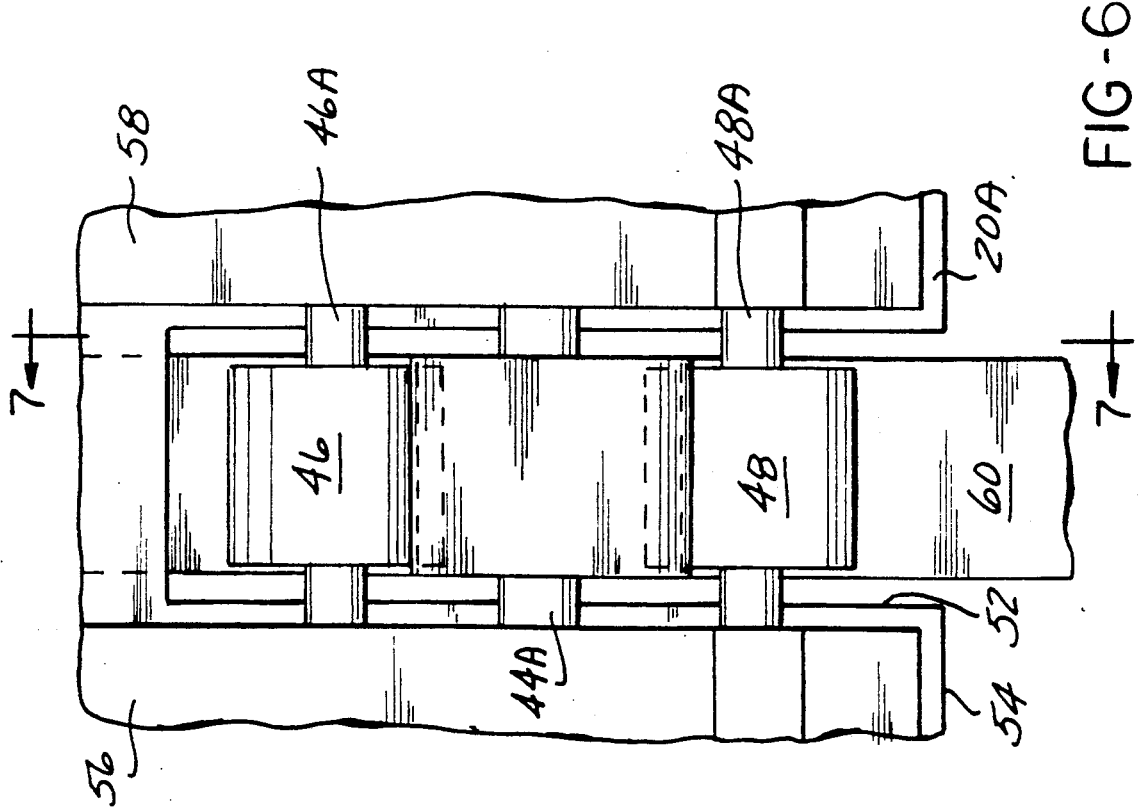
FIG. 6 is a simplified front view of a portion of the drive unit.

The relationship of drive gear 44, idler pulleys 46, 48 and frame members 20 and 22 is best seen in the simplified diagrams of FIG. 6 and 7. Referring first to FIG. 6, it is seen that a rectangular opening 52 is cut through the front wall 20A of fixed frame member 20 to extend upwardly from the lower edge 54 of frame member 20. At opposite sides of opening 52, bearing blocks partially indicated at 56, 58 are fixedly mounted to front wall 20A to rotatably support the shafts 46A, 44A and 48A of upper idler roll 46, drive gear 44 and lower idler roll 48 respectively. Idler rolls 46 and 48 and drive gear 44 are positioned directly in front of opening 52, and as best seen in FIG. 7, a portion of the periphery of idler rolls 46 and 48 actually projects rearwardly (to the right as viewed in FIG. 7) through opening 52.

Drive gear 44 is coupled to lifting member 22 by an elongate flexible belt 60 which is fixedly secured at one end as at 62 (FIG. 2) to front wall 22A of lift member 22 adjacent the lower end of the lift member and is similarly fixedly secured at its opposite end to the front face 22A of lift member 22 at the upper end of lift member 22. As best seen in FIG. 7, the spacing between the peripheries of idler rolls 46 and 48 and front wall 22A of lift member 22 is such that belt 60 lies in flat face-to-face engagement with front wall 22A in its extent between the upper 46 and lower 48 idler rolls and the respective upper and lower ends of lift member 22. A bight portion 60B of belt 60 projects forwardly from front wall 22A of lift member 22 between the upper and lower idler rolls 46, 48 and around the forward most portion of the periphery of drive gear 44. That face of the belt which lies against drive gear 44 and front wall 22A is formed with transversely extending teeth 60T which are dimensioned to mesh with the teeth of drive gear 44, belt 60 being maintained in tension by the fixed connections between its opposite ends and the upper and lower ends of lift member 22.

It is believed apparent that upon rotation of drive gear 44 in a clockwise direction as viewed in FIG. 7, belt 60 will be driven upwardly to thereby move lift member 22 upwardly relative to the fixed frame member 20 upon which drive gear 44 is rotatably mounted. Similarly, upon rotation of drive gear 44 in a counter-clockwise direction as viewed in FIG. 7, the belt 60, and hence lift member 22 will be moved downwardly relative to fixed frame member 20. Commercially available belts of synthetic materials, such as fiberglass reinforced nylon, possess substantial strength, and this particular type of drive is thus capable of lifting loads of substantial weight. Computer control systems are commercially available for precisely controlling the operation of a reversible electric motor such as 42 so that precise positioning can be achieved, while the speed reducer mechanism which couples holder 42 to drive gear 44 may be selected to provide the optimum compromise between lifting force and speed of lift obtainable from a given bolder horse power rating.

However, a further important advantage of the drive arrangement here disclosed is the fact that all of the components of the drive system are located outside of the interior of the hollow tubular lifting member 22 and, with the motor and drive components on the stationary fixed frame member 20 enclosed as within a housing 66 indicated in broken line in FIG. 1. The only exposed portion of the drive is that portion of belt 60 which extends below the lower end of fixed frame member 20, and this exposed portion of the belt lies flat against and does not move relative to the front wall 22A of lift member 22.

Figure 3:
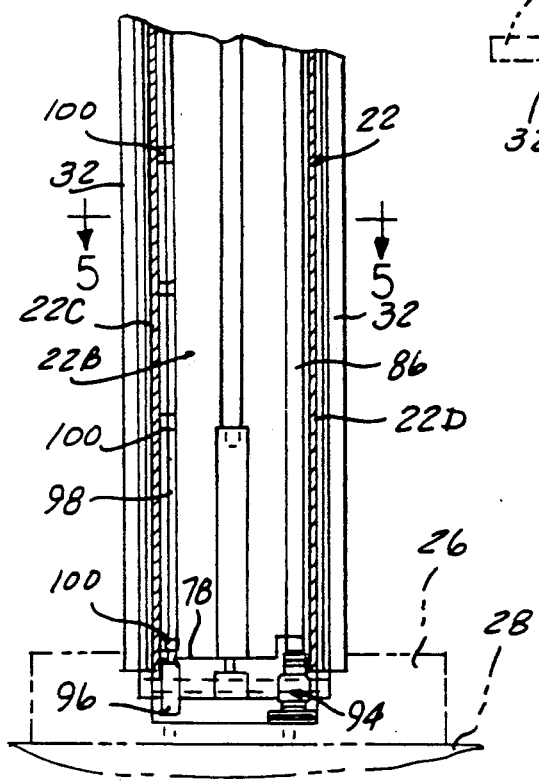
FIG. 3 is a sectional view of the lifting device of FIG. 1, taken from the front, with certain parts omitted, broken away and shown in sections.

Referring now to FIGS. 3-5, to counterbalance the dead weight of lift member 22, the cylinder 70 of a pneumatic counterbalance motor is located, rod end downwardly, within fixed frame member 20 and fixedly secured at its upper end to a mounting plate 72 secured to the upper end of fixed frame member 20, cylinder 70 projecting downwardly through frame member 20 and into lift member 22. In FIG. 3, the lift member 22 is shown at its extreme lower end limit of movement, and in this position, it is seen that the lower end of cylinder 70 is located within the interior of lift member 22 below the upper end 74 of lift member 22.

The piston rod 76 of cylinder 70 extends vertically downwardly and is fixedly secured at its lower end to an end plate 78 fixedly mounted in the lower end of lift member 22. Piston rod 76 is coupled in a well known manner to a piston (not shown) located within cylinder 70, and by supplying air under pressure to the lower end of cylinder 70, piston rod 76 is urged upwardly. By appropriate regulation of the pressure below the piston, the downward gravitational force applied by lift member 22 to piston rod 76 may be counterbalanced in a well known manner.

In order to supply this air under pressure to the lower end of cylinder 70, it is necessary to run a pneumatic conduit 82 downwardly through the interior of fixed frame member 20 to the lower end cap 80 of cylinder 70, conveniently this conduit may be run down one side of cylinder 70 as at 82 in FIG. 4. The upper end of cylinder 70 conventionally is simply vented to atmosphere through a vent (not shown) through upper end cap 82 of cylinder 70 and mounting plate 72.

To supply air under pressure to a work holder 28 carried on the lower end of lift member 22, one or more rigid air supply conduits 84 (FIGS. 3-4) is fixedly secured at its upper end to end plate 78 to project vertically downwardly through fixed frame member 20 to a lower end located adjacent the lower end of frame member 20. A second rigid air supply conduit 86 is fixedly secured at its bottom end to end plate 78 at the lower end of lift member 22 to project vertically upwardly through frame member 20 to an upper end 88 (FIG. 3) which is slidably and telescopically received within the aligned air supply conduit 84 fixed to the upper frame member. A sliding seal 90 at the lower end of conduit 84 seals the sliding joint between the two conduits 84, 86. The upper end of each conduit 84 is in fluid communication with a coupling such as 92 on plates 72 for coupling air supply conduit 84 to a stationary source of air under pressure, as by a flexible hose, (not shown). The lower end of the lower air supply conduit 86 is in fluid communication at its lower end with a coupling 94 adapted to mate with an air supply conduit carried by work holder 28. The lower air supply conduit 86 is freely slidable upwardly and downwardly within the upper air supply conduit 84 during raising and lowering movement of the lift.

To supply electrical power, if necessary, to work holder 28, an electrical connector 96 on end plate 78 at the bottom of lift member 22 is electrically connected to a plurality of electric contact strips 98 which are mounted upon a plurality of mounting blocks 100 of electrical insulating material to extend vertically upwardly through the interior of lift member 22 to a location adjacent the upper end of the lift member. A power track and ribbon cable may alternately be used.

Figure 8:
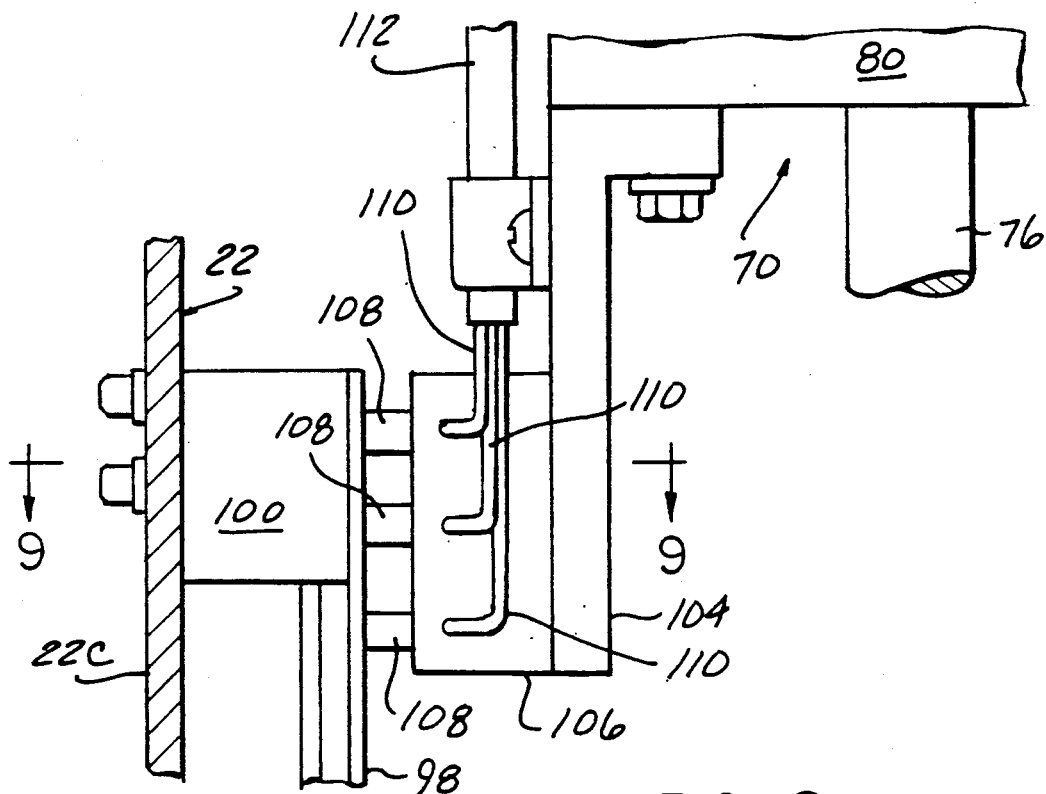
FIG. 8 is a detail view of a portion of the electrical interconnection between the fixed frame member and lifting member.
Figure 9:
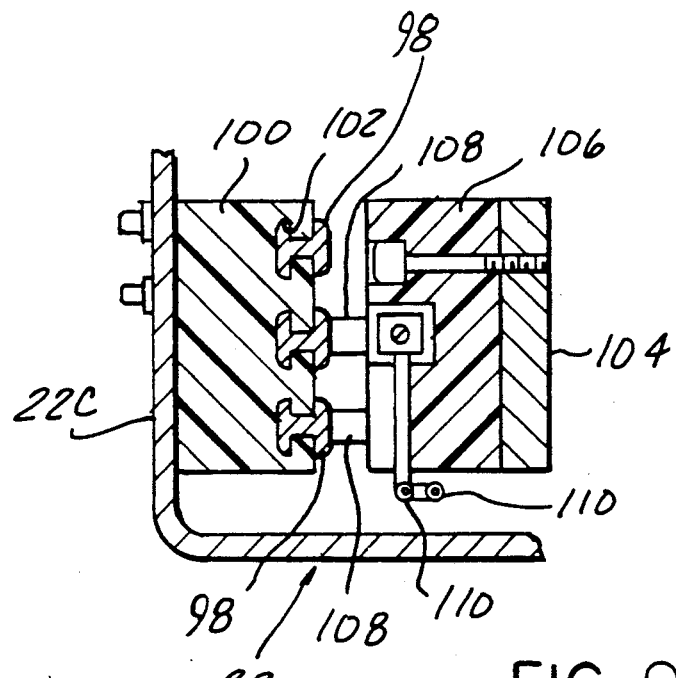
FIG. 9 is a cross sectional view taken on line 9—9 of FIG. 8.

Referring now particularly to FIGS. 8 and 9, as best seen in FIG. 9, the individual electric contact strips 98 are of a H-shaped transverse cross section and are received in slots 102 of a T-shaped cross section formed in the mounting blocks 100 so that the strips 98 are fixedly held by the block with one side surface of the strip exposed at one side of the block.

Referring now particularly to FIG. 8, a mounting bracket 104 is fixedly mounted upon end cap 80 of counterbalance cylinder 70 to fixedly support a slide block 106 of electrical insulating material which carries electrical contacts 108 which project from one side of block 106 into sliding engagement with the respective opposed side surfaces of contact strips 98. The individual contacts 108 are connected respectively to the conductors 110 of an electric power supply cable 112 which is led up the side of counterbalance cylinder 70 to the upper end of fixed frame member 20 where it may be either connected to an electrical connector mounted in mounting plate 72 or, as shown in FIG. 1, led through an opening in fixed frame member 20 and then downwardly to a terminal block (not shown) which also feeds power to drive motor 42. Upon vertical movement of lift member 22 relative to fixed frame member 20, the contacts 108 carried on the lower end of counterbalance cylinder 70 slide along the vertically extending contact strips mounted on lift member 22.

While frame member 20 has been described as a "fixed" frame member, in a typical application of the lift device described above, frame member 20 is fixed to a carriage or carrier movable along a horizontal path so that articles carried by the lift may be transferred by the lift unit from tooling at one work station to tooling at a second work station spaced horizontally from first work station. Because the work holder 28 must releasably grip the article being transferred, it is necessary that pneumatic and/or electrical connections must be made to the work holder which, during an operating cycle, will be moved both vertically and horizontally. The air supply source and the source of electrical power are fixed, and thus, running flexible electrical cables and air supply hoses directly from the power source to the work holder would require some effort to avoid entanglement of these lines with tooling, workmen and moving parts of the system. The arrangement disclosed above finds all of these external power source lines being led to the upper end of the fixed frame member 20 which moves only in a straight line horizontal path at a distance well above the plant floor. By locating all of the lift drive elements externally of the lifting member 20, the entire interior of the hollow tubular lift member is available to provide adequate working clearance for electric and pneumatic supply conduits which present a sliding seal or contact between the fixed and movable portions of the power supply system, enabling assembly or disassembly of these units by vertical insertion or withdrawal of the lift member 22 from the fixed frame member 20.

The belt drive arrangement, while located externally of the lift member, presents no additional exposed parts which move relative to the lift member, an obvious advantage from the stand point of safety. In addition, the positive drive coupling provided by the meshed inter engagement between the toothed drive belt and drive gear provides a smooth, precisely controllable, and powerful drive.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. An article lifting device comprising first and second vertically elongate hollow tubular members each of a generally rectangular transverse cross section including a front wall, a rear wall and opposed side walls, the transverse dimensions of said second member being substantially less than the corresponding transverse dimensions of said first member, roller means mounted on the opposed side walls of one of said tubular members engaged with track means fixedly mounted on the opposed side walls of the other of said tubular members for guiding said second member in telescopic vertical movement within said first member, means defining an opening in the front wall of said first member adjacent the lower end thereof, a drive gear mounted on said first member for rotation about a horizontal drive axis parallel to and spaced forwardly from said front wall of first member, an upper and a lower idler roll mounted on said front wall of said first member for rotation about respective upper and lower idler axes parallel to and located respectively above and below said drive axis, said idler rolls being horizontally aligned with said opening, an elongate flexible drive belt having upper and lower end sections extending along the front wall of said second member and joined to each other by a bight portion projecting forwardly from said second member through said opening in said front wall of said first member between said idler rolls and around said drive gear, said belt having teeth means on the rear side thereof meshed with said drive gear, means securing the opposite ends of said belt in tension to said front wall of said second member respectively adjacent the upper and lower ends of said second member, reversible drive means on said first member for driving said drive gear in rotation about said drive axis to drive said belt to shift said second member vertically relative to said first member, first mounting means for fixedly mounting said first member upon a support, second mounting means at the lower end of said second member for coupling an article to be lifted to said second member, and counterbalancing means coupled between the upper end of said first member and the lower end of said second member for counter balancing the weight of said second member.

2. The invention defined in claim 1, wherein said counterbalancing means comprises pneumatic motor means including an elongate cylinder fixedly mounted at one end upon the upper end of said first member and projecting vertically downwardly through said first member into the interior of said second member, a piston rod operatively mounted in said cylinder and projecting downwardly through said second member, and means, fixedly securing said piston rod to the lower end of said second member.

3. The invention defined in claim 2 further comprising a plurality of electrically conductive contact strips fixedly mounted on the interior of said second member and extending vertically substantially the entire length of said second member, and a plurality of electric contact elements fixedly mounted on the lower end of said cylinder in respective sliding electric contact with said plurality of strips.

4. An article lifting device comprising first and second vertically elongate hollow tubular members each of a generally rectangular transverse cross section including a front wall, a rear wall and opposed side walls, the transverse dimensions of said second member being substantially less than the corresponding transverse dimensions of said first member, roller means mounted on the opposed side walls of one of said tubular members engaged with track means fixedly mounted on the opposed side walls of the other of said tubular members for guiding said second member in telescopic vertical movement within said first member, means defining an opening in the front wall of said first member adjacent the lower end thereof, a drive gear mounted on said first member for rotation about a horizontal drive axis parallel to and spaced forwardly from said front wall of first member, an upper and a lower idler roll mounted on said front wall of said first member for rotation about respective upper and lower idler axes parallel to and located respectively above and below said drive axis, said idler rolls being horizontally aligned with said opening, an elongate flexible drive belt having upper and lower end sections extending along the front wall of said second member and joined to each other by a bight portion projecting forwardly from said second member through said opening in said front wall of said first member between said idler rolls and around said drive gear, said belt having teeth means on the rear side thereof meshed with said drive gear, means securing the opposite end of said belt in tension to said front wall of said second member respectively adjacent the upper and lower ends of said second member, reversible drive means on said first member for driving said drive gear in rotation about said drive axis to drive said belt to shift said second member vertically relative to said first member, first mounting means for fixedly mounting said first member upon a support, second mounting means at the lower end of said second member for coupling an article to be lifted to said second member, wherein said second mounting means comprises a pneumatic coupling at the lower end of said second member, a first rigid tubular conduit sealingly connected at its lower end to said coupling and extending vertically upwardly through said second member to a location adjacent the upper end of said second member, a second rigid tubular conduit fixedly secured to the upper end of said first member and extending vertically downwardly through said first member into said second member to sealingly and slidably, telescopically receive said first conduit therein to establish a pneumatic supply connection between said coupling and the upper end of said first member.

5. An article lifting device comprising first and second vertically elongate hollow tubular members each of a generally rectangular transverse cross section including a front wall, a rear wall and opposed side walls, the transverse dimensions of said second member being substantially less than the corresponding transverse dimensions of said first member, roller means mounted on the opposed side walls of one of said tubular members engaged with track means fixedly mounted on the opposed side walls of the other of said tubular members for guiding said second member in telescopic vertical movement within said first member, means defining an opening in the front wall of said first member adjacent the lower end thereof, a drive gear mounted on said first member for rotation about a horizontal drive axis parallel to and spaced forwardly from said front wall of first member, an upper and a lower idler roll mounted on said front wall of said first member for rotation about respective upper and lower idler axes parallel to and located respectively above and below said drive axis, said idler rolls being horizontally aligned with said opening, an elongate flexible drive belt having upper and lower end sections extending along the front wall of said second member and joined to each other by a bight portion projecting forwardly from said second member through said opening in said front wall of said first member between said idler rolls and around said drive gear, said belt having teeth means on the rear side thereof meshed with said drive gear, means securing the opposite ends of said belt in tension to said front wall of said second member respectively adjacent the upper and lower ends of said second member, reversible drive means on said first member for driving said drive gear in rotation about said drive axis to drive said belt to shift said second member vertically relative to said first member, first mounting means for fixedly mounting said first member upon a support, and second mounting means at the lower end of said second member for coupling an article to be lifted to said second member, wherein said second mounting means comprises an electrical connector at the lower end of said second member, a plurality of electrically conductive contact strips electrically connected to said connector and extending vertically upwardly through the interior of said second member to respective upper ends located adjacent the upper end of said second member, electrical insulating means fixedly mounting said strips upon said second member in spaced parallel relationship to each other and to said second member, a plurality of electrical contact elements fixedly mounted in the interior of said first member adjacent the lower end thereof in respective sliding electrical contact with said plurality of contact strips, and electrical conductor means electrically connected to said contact elements and extending upwardly through said first member to the upper end thereof.

* * * * *